May 7, 1935.　　　P. SCHMITT　　　2,000,718
RHEOSTAT
Filed Aug. 14, 1930　　　3 Sheets-Sheet 1

Inventor:
P. Schmitt.
by
Langner, Parry, Card & Langner.
Attys.

May 7, 1935.  P. SCHMITT  2,000,718
RHEOSTAT
Filed Aug. 14, 1930  3 Sheets-Sheet 2
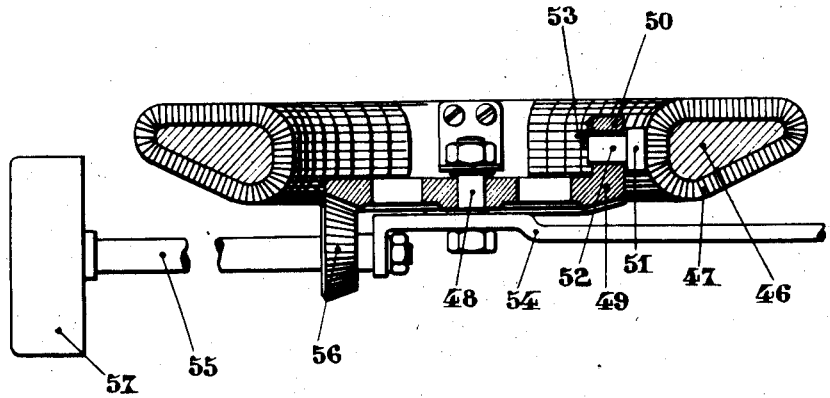
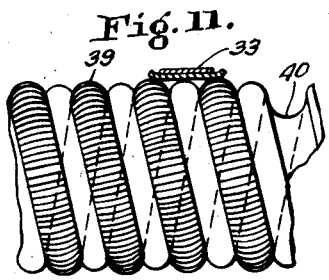
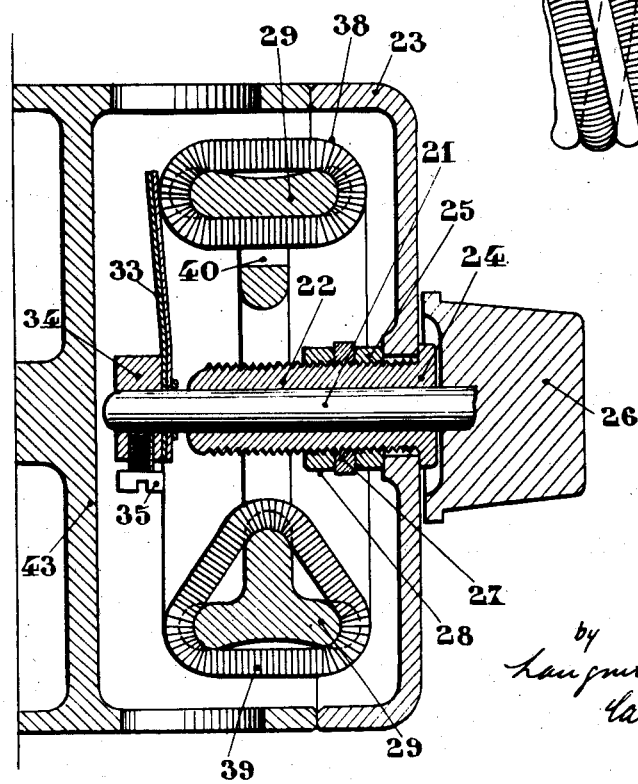
Inventor:
P. Schmitt,
by Langner, Parry,
Card & Langner
Attys.

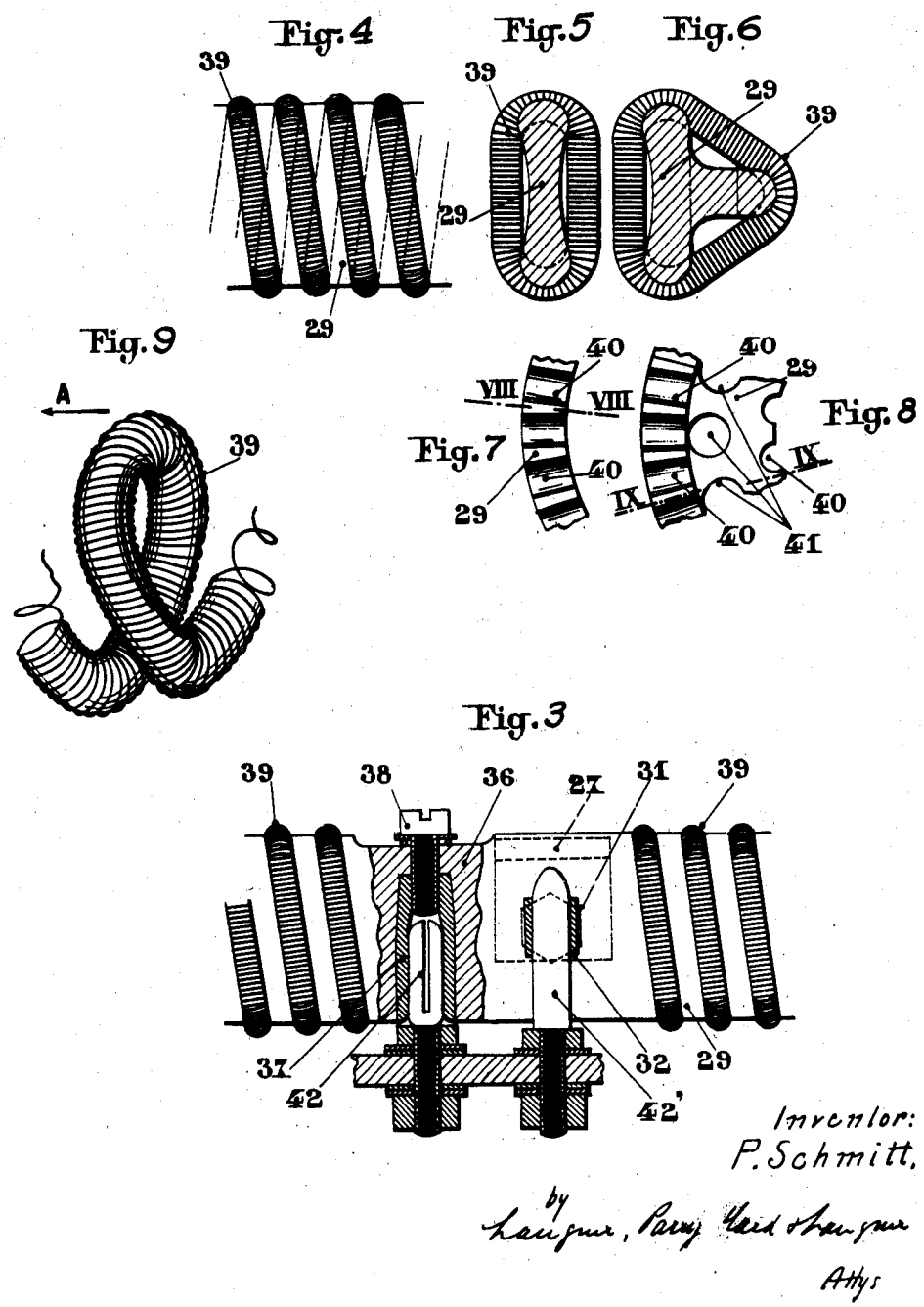

Patented May 7, 1935

2,000,718

UNITED STATES PATENT OFFICE 2,000,718

RHEOSTAT

Paul Schmitt, Paris, France

Application August 14, 1930, Serial No. 475,240
In France February 3, 1930

12 Claims. (Cl. 201—56)

The present invention relates to graduated control circuits and rheostats therefor and, more particularly, to lighting circuits.

One of the objects of the invention is to provide novel forms of rheostat design.

Further objects will appear in the course of the detailed description now to be given with reference to the accompanying drawings, in which:—

Fig. 2 is a section taken on line V—V of Fig. 1;

Fig. 3 is a partial section taken on line VI—VI of Fig. 1;

Fig. 4 shows a portion of the rheostat-resistance winding mounted on its support;

Figs. 5 and 6 show two forms of resistance support;

Fig. 7 is a plan of part of the support represented in Fig. 5;

Fig. 8 is a similar view of the support illustrated in Fig. 6;

Fig. 9 is a perspective of part of the resistance winding;

Fig. 10 is a profile, in partial section, of a heavy duty rheostat; and

Fig. 11 shows a portion of a rheostat-resistance winding mounted on its support.

Figure 1:
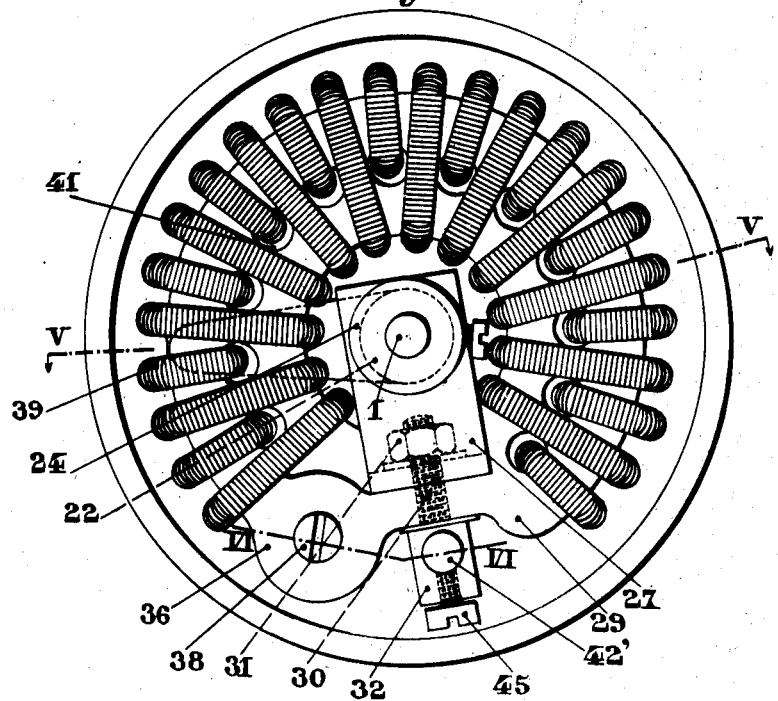
Fig. 1 illustrates, in plan, a novel form of rheostat.

The drawings illustrate various forms of rheostats adapted to be used in electric circuits. Here, a casing 43 fitted with a cover 23, houses an assembly composed of an insulating resistance support 29 which may have either the form shown in Figs. 5 or 6, a threaded post 22 terminating in an expanded portion 24, a nut 25, an arm 27 rigidly attached to support 29 by a bolt 32 having a threaded portion 30 in engagement with a nut 31, a nut 28 supporting arm 27, a rotatable pin 21, a sliding contact 33 rigidly connected to a block 34, a set screw 35 adapted to hold elements 33, 34 in any position of adjustment on pin 21, a spiral resistance wire 39 wound in grooves 40 of substantially the same depth as the diameter thereof and passing alternately through holes 41 and over grooves 40, and a supporting assembly for the ends or resistance composed of a dowel 37 anchored in reenforced portion 36 of support 29 by means of a screw 38, a pin 42 fitting into dowel 37 and supporting a bar 43, and a second pin 42' fitting into a proper orifice and held in position by set screw 45.

From the foregoing it will be seen that when a handle 26, connected to pin 21 by proper set screws, is rotated, contact 33 will slide along resistance 29 in a direction corresponding to that of the individual turns of wire composing the latter (rather than across the direction of the individual turns) until it contacts with either abutments 42 or 42¹. When contact is made at 42, it moves out of contact with resistance 39 (the latter terminates under screw 38) and opens the circuit. Contrariwise, when in contact with 42', the resistance is short-circuited.

This form of rheostat has the advantage of providing a maximum of cooling space for resistance 39 and causing a minimum of wear for the latter in virtue of the relative parallelism of the wire turns and the direction of movement of contact 33.

The variant shown in Fig. 10 is designed for carrying heavy currents and is composed of an annular insulating support 46 carrying resistance winding 47, a rotatable shaft 48, a bevel gear 49 keyed to shaft 48 and having an arm 50 integral therewith, a brush head 51 having a shank 52 traversing an opening in arm 50, a spring 53 tending to maintain head 51 in firm contact with turns 47, a shaft 55, a bevel gear 56 keyed to the latter and meshing with gear 49, a shaft support 54 suspended from shaft 48, and a rotatable handle 57 firmly attached to shaft 55.

It is obvious that, when element 57 is rotated, brush 51 will be displaced to vary the number of turns of resistance 47 in circuit.

The inventor is aware of the existence of resistances composed of a spiral winding wound on a refractory support (electric radiators for domestic use) having circular notches formed therein for receiving the resistance winding. But structures of this kind do not function in combination with a displaceable contact and the mechanical resistance thereof does not intervene in the least. Similarly, the notches have no mechanical function since no contact element is displaced relatively thereto.

Under the conditions in view, the essential novelty characterizing the rheostat forming the subject matter of the present invention, is the application to such a rheostat, i. e. to a variable resistance, of scattered elements already in public use, and uniting them into a combination wherein their individual functions are different from what they were before. Thus, the application of the idea of a double winding minimizes the mechanical effort exerted on individual turns by a sliding contact moving thereover, thereby increasing the mechanical resistance of the winding to a maximum, this result being further increased by properly adjusting the depth of the notches with relation to the section of the wire, the teeth between said notches supporting substantially all of the mechanical effort exerted by the sliding contact, the total assembly thus forming a new combination composed of the following three elements: a double winding, deep notches, and a sliding contact, which combination constitutes a rheostat functioning progressively and capable of a great many applications.

What I claim is:

1. A rheostat comprising a radially resilient helix of resistance wire of circular section wound in a plurality of turns of said helix, substantially circular means for supporting said helix, so that each of its turns lies in a radial position, a rotatable contact member mounted to slide across said resistance wire in the mean direction of the individual turns of wire and to compressively contact thereagainst, and said resistance helix being so mounted upon said supporting means that the individual turns of wire are free to yield resiliently upon the passage of the rotatable contact thereover.

2. A resistor, comprising an annular frame, a plurality of grooves distributed about the outer periphery of said frame. the inner periphery of said frame having half the number of grooves of the outer periphery, and the said frame having a circular row of holes extending therethrough, of like number as the number of grooves on the inner periphery, and in staggered relation with respect thereto, a coiled resistance wire wound in helical manner about said frame, alternate inner turns of said coil extending through one of said holes and then resting in one of the grooves of the inner periphery of said frame, all of the outer turns resting in the grooves of the outer periphery, the said frame having a T-shaped section, so that no contact exists between the frame and the resistance wire except where the latter engages with said grooves and holes, and a rotatable contact member contacting the said resistance wire.

3. A rheostat comprising supporting means provided with grooving, the axis of said grooving being sinuate, a resilient contact adapted for moving across the axis of said grooving, and resilient conducting means disposed in said grooving and adapted for pressing against said contact, the contacting area of said conducting means being restrained by the side walls of said grooving from moving in the direction of motion of said contact but being otherwise unrestrained, the walls of said grooving being sufficiently high to support said resilient contact at least in part as said contact moves from one portion of said grooving to another, but without lifting said contact away from said conducting means.

4. A rheostat comprising a coiled resistance wire, a core having grooves therein and adapted for retaining at least a portion of said coiled wire, said coiled wire being helically arranged and positioned at least in part in said grooves, said wire being unsupported from within the helical conformation, and a movable contact adapted for contacting the exposed parts of said wire by moving substantially in the planes of the turns contacted, whereby the pressure of contact is transmitted to the side walls of said grooves without substantial displacement of the planes of said turns, said walls supporting in part said contact while said contact is engaging said wire.

5. A rheostat comprising a coiled resistance wire, a core having grooves therein and adapted for retaining at least a portion of said coiled wire, said coiled wire being positioned at least in part in said grooves, and being unsupported from within the coils thereof, and a movable contact adapted for contacting the exposed parts of said wire by moving substantially in the planes of the turns contacted, whereby the pressure of contact is transmitted to the side walls of said grooves without substantial displacement of the planes of said turns, said walls supporting in part said contact while said contact is engaging said wire.

6. A rheostat comprising a coiled resistance wire, a core having grooves therein and adapted for retaining at least a portion of said coiled wire, said coiled wire being positioned at least in part in said grooves, said turns of said wire in said grooves being otherwise self-supporting, and a movable contact adapted for contacting the exposed parts of said wire by moving substantially in the planes of the turns contacted, whereby the pressure of contact is transmitted to the walls of said grooves without substantial displacement of the planes of said turns, said walls supporting in part said contact while said contact is engaging said wire.

7. A rheostat comprising a coiled resistance wire, a core having grooves therein and adapted for retaining at least a portion of said coiled wire, said coiled wire being positioned at least in part in said grooves, the planes of said turns in said grooves being displaceable, and a movable contact adapted for contacting the exposed parts of said wire by moving substantially in the planes of the turns contacted, whereby the pressure of contact is transmitted to the walls of said grooves without substantial displacement of the planes of said turns, said walls supporting in part said contact while said contact is engaging said wire.

8. A rheostat comprising a resilient helix of resistance wire, means for supporting said helix, and contact means adapted for sliding across said wire in the mean direction of the individual turns of said wire and for contacting compressively thereagainst, said resistance helix being so mounted upon said supporting means that the individual turns of wire are free to yield resiliently upon the passage of the rotatable contact thereon, said supporting means also supporting in part said contacting means while said contacting means is engaging said wire.

9. In a rheostat, an annular support provided with notches and holes, a resistance mounted on said support and coacting with said notches and holes, the turns being wound around said support, said resistance, aside from said turns, being helical, said support being formed to lie out of contact with said resistance except where said resistance engages with its notches and holes, and contact means adapted for sliding over said resistance.

10. A resistor comprising an annular frame, having a plurality of grooves on the outer periphery thereof, having a smaller plurality of grooves on the inner periphery and having a plurality of holes extending through said frame, said smaller plurality and said plurality of holes making a total about equal to said first-mentioned plurality, and a resistance wound about said frame, certain of the inner turns of said coil resting in said inner grooves and certain others of said inner turns passing through holes, said resistor, apart from said turns, being itself helical.

11. A rheostat comprising a core, a coiled resistance wire, said core having grooves therein of a depth substantially equal to the diameter of the coils of the resistance wire, and the said resistance wire being wound into a helix and without a supporting core within said helix, and positioned in said grooves, a rotatable contact directly contacting the exposed part of said resistance wire, the extreme depth of said grooves insuring that the load of said contact, when the latter is moving tangentially over the individual coils of said resistance wire, will be taken up principally by the side walls of the grooves in said core.

12. A rheostat comprising an annular suppport having alternate grooves and holes, a coiled resistance wire wound in a helical manner with a series of radially-extending portions about said annular support and extending alternately through the said grooves and holes thereof, the annular support having cut-out portions so that it is out of contact with said resistance wire except where the latter engages with said grooves and holes, a rotatable contact mounted to slide over said resistance, and said grooves being of such depth that the spiral resistance lies almost totally therein, and the principal part of the load impressed on the wire by the contact is transmitted to the walls of said grooves.

PAUL SCHMITT.